US007979520B2

(12) United States Patent
Hardwick et al.

(10) Patent No.: US 7,979,520 B2
(45) Date of Patent: Jul. 12, 2011

(54) PRESCRIPTIVE ARCHITECTURE RECOMMENDATIONS

(75) Inventors: Jonathan C. Hardwick, Kirkland, WA (US); Efstathios Papaefstathiou, Redmond, WA (US); David E Guimbellot, Bellevue, WA (US); John M Oslake, Seattle, MA (US); Pavel A Dournov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/107,657

(22) Filed: Apr. 15, 2005

(65) Prior Publication Data

US 2006/0235859 A1    Oct. 19, 2006

(51) Int. Cl.
*G06F 15/173* (2006.01)
(52) U.S. Cl. .................. 709/223; 707/899
(58) Field of Classification Search .......... 707/100, 707/102; 709/223, 203, 217, 219, 228; 713/300; 702/187
See application file for complete search history.

(56) References Cited

U.S. PATENT DOCUMENTS

| | | | |
|---|---|---|---|
| 4,631,363 A | 12/1986 | Foster et al. | |
| 5,388,196 A | 2/1995 | Pajak et al. | |
| 5,838,319 A | 11/1998 | Guzak et al. | |
| 5,920,700 A | 7/1999 | Gordon et al. | |
| 5,953,724 A | 9/1999 | Lowry | |
| 5,978,576 A | 11/1999 | Sanadidi et al. | |
| 6,192,470 B1 | 2/2001 | Kelley et al. | |
| 6,301,701 B1 | 10/2001 | Walker et al. | |
| 6,496,842 B1 | 12/2002 | Lyness | |
| 6,904,449 B1 * | 6/2005 | Quinones | 709/203 |
| 6,968,324 B1 * | 11/2005 | Ruffin et al. | 705/400 |
| 7,020,697 B1 * | 3/2006 | Goodman et al. | 709/223 |
| 7,096,178 B2 | 8/2006 | Gluhovsky | |
| 7,111,177 B1 * | 9/2006 | Chauvel et al. | 713/300 |
| 7,149,731 B2 | 12/2006 | Dettinger et al. | |
| 7,174,194 B2 * | 2/2007 | Chauvel et al. | 455/574 |
| 7,451,064 B2 * | 11/2008 | Hodge et al. | 702/187 |
| 7,577,681 B1 | 8/2009 | Rozenman et al. | |
| 2001/0052108 A1 * | 12/2001 | Bowman-Amuah | 717/1 |
| 2002/0065049 A1 * | 5/2002 | Chauvel et al. | 455/66 |
| 2002/0178075 A1 * | 11/2002 | Emerick et al. | 705/26 |
| 2003/0046396 A1 | 3/2003 | Richter et al. | |
| 2003/0058277 A1 * | 3/2003 | Bowman-Amuah | 345/765 |
| 2003/0163298 A1 | 8/2003 | Odom et al. | |
| 2003/0167381 A1 | 9/2003 | Herscovich et al. | |
| 2003/0172145 A1 * | 9/2003 | Nguyen | 709/223 |
| 2003/0176993 A1 | 9/2003 | Lines et al. | |
| 2004/0049372 A1 | 3/2004 | Keller | |
| 2004/0107219 A1 | 6/2004 | Rosenberger | |
| 2004/0181794 A1 | 9/2004 | Coleman et al. | |
| 2005/0027661 A1 * | 2/2005 | Lober et al. | 705/400 |
| 2005/0102121 A1 * | 5/2005 | Odhner et al. | 703/1 |
| 2005/0125401 A1 | 6/2005 | Carr et al. | |

(Continued)

OTHER PUBLICATIONS

Marc, "Free Windows Explorer replacement with tabbed UI", Apr. 7, 2004, 2 pages.

(Continued)

*Primary Examiner* — Hung T Vy
(74) *Attorney, Agent, or Firm* — Lee & hayes, PLLC

(57) ABSTRACT

A prescribed system architecture is recommended to an entity that desires to implement a system supporting distributed applications. A performance scenario is created based on anticipated usage, devices employed by servers running the distributed applications, and topology of locations using the servers. An optimized scenario may be provided by determining device optimization, different use load, and if possible consolidation of distributed applications on servers.

20 Claims, 6 Drawing Sheets

U.S. PATENT DOCUMENTS

| | | | |
|---|---|---|---|
| 2005/0195165 A1 | 9/2005 | Mitchell | |
| 2006/0004923 A1* | 1/2006 | Cohen et al. | 709/228 |
| 2006/0047813 A1* | 3/2006 | Aggarwal et al. | 709/226 |
| 2006/0075286 A1* | 4/2006 | Hodge et al. | 714/5 |
| 2006/0112130 A1* | 5/2006 | Lowson | 707/102 |
| 2006/0161417 A1 | 7/2006 | Hardwick et al. | |
| 2006/0167704 A1* | 7/2006 | Nicholls et al. | 705/1 |
| 2007/0288526 A1 | 12/2007 | Mankad et al. | |
| 2009/0240691 A1 | 9/2009 | Yano et al. | |

OTHER PUBLICATIONS

PCT Search Report for Patent Application No. 0609245 Mailed on Oct. 30, 2007, 7 pages.

PCT Search Report for Patent Application No. 0609282 Mailed on Dec. 4, 2007, 7 pages.

PCT Search Report for Patent Application No. 0609161 Mailed on Oct. 16, 2007, 7 pages.

J.P. Buzen, "Fundamental Operational Laws of Computer System Performance", 1976, Acta Informatica, vol. 7, pp. 167-182.

Daniel A Menasce et al., "Performance by Design: Computer Capacity Planning by Example", 2004, Prentice Hall, 24 unnumbered pages.

Lu, et al., "Operating-System Directed Power Reduction", Internal Symposium on Low Power Electronics and Design, 2000, pp. 37-42.

* cited by examiner

PRESCRIPTIVE ARCHITECTURE RECOMMENDATIONS

TECHNICAL FIELD

This invention relates to prescribing or recommending a system architecture that supports distributed software applications.

BACKGROUND

Distributed software applications include email and messaging applications, web services, and customer relationship management. Such distributed software applications may be provided through systems that employ service-oriented architectures (SOA). SOAs typically are network based with multiple users accessing or using the distributed software applications.

When a business or entity decides to implement an architecture, such as a SOA, the entity predetermines an architecture that includes various server computers (servers), storage (e.g., disk arrays), interconnections (e.g. networks), and other hardware. The predetermined architecture should be designed to effectively support the distributed software applications that the entity desires to implement. Predetermining the architecture should provide for an optimal architecture that maximizes hardware usage without overloading the hardware; adequately supports expected users; and allows for future expected growth. If performed correctly, predetermining the architecture can effectively prevent the entity from investing more than is needed, yet also meet anticipated future needs.

In general, present methods to predetermine architectures are complex, time consuming, expensive, and sometimes not very accurate. Present methods to predetermine an architecture include hiring consultants, or performing the predetermination "in-house". Performing the predetermination in-house usually involves extensive and costly training, along with the purchase of licensed performance models. Regardless of the method, present methods may be labor intensive, and involve gathering and entering various inputs. Typically, present methods rely on guesses based on specific hardware performance metrics. Such metrics may not address the requirements of specific software applications, and particularly the affect of running the specific software applications. For example, a particular server may provide different results than another server when running a particular software application. In addition, the number of users accessing software applications may be fixed, and no provision is made as to scenarios where the number of users is increased.

Considering the present methods in predetermining an architecture, a significant up front expense is incurred in the decision process of implementing or providing for a service. In certain cases, the decision is made not to implement the service; however, a costly expense is incurred in predetermining the architecture.

In many cases, it is desirable to allow entities to determine an architecture to support their service needs (i.e., distributed software applications), before a commitment is made to implement such an architecture. The determination should be cost effective and generated in a timely manner. The predetermined or prescribed architecture should be an accurate recommendation that meets expected and future needs, and flexible enough to account for different scenarios, such as usage and different software applications.

SUMMARY

A predetermination is performed to recommend a system architecture that supports distributed applications, by accounting for user profile of an entity. Consideration is made as to hardware that supports the distributed applications. An architecture of networked computers (servers) that supports the system is recommended. The system is presented as a performance scenario. The performance scenario may be further processed to account for different devices that may be used by the computers (servers) and consolidation of applications on computers to create an optimized performance scenario.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques in which a prescriptive architecture is recommended based on anticipated performance and usage.

Figure 1:
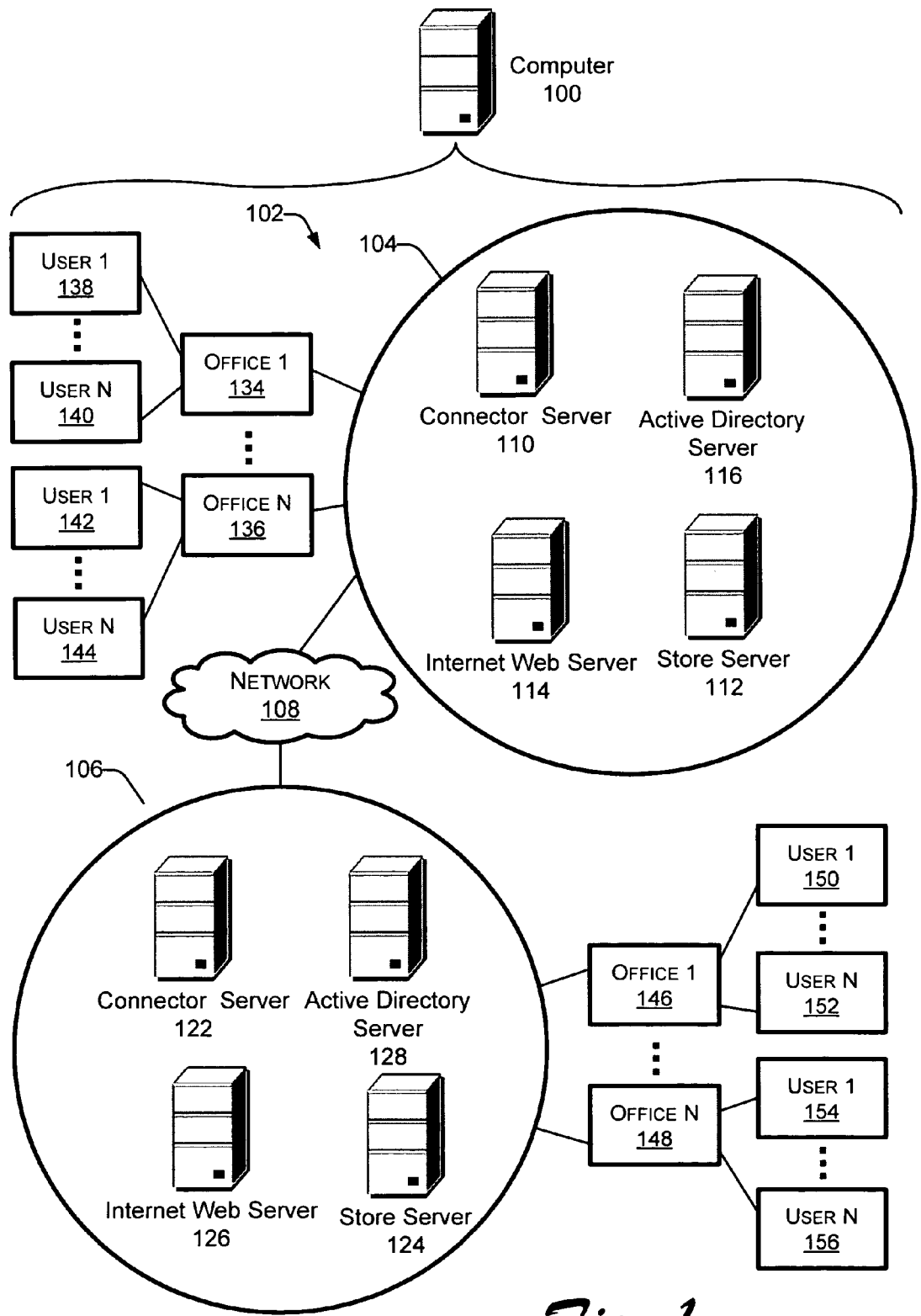
FIG. 1 is an illustration of a prescribed system created by a computer that is recommended based on hardware performance, a number of users, and software applications.

FIG. 1 shows a prescribed system architecture. A computer 100, and particularly components and applications implemented by computer 100 create a system architecture or system 102 prescribed or recommended to an entity for implementing a particular service that uses specific hardware and software applications. The software applications may be termed "distributed" software applications and include software applications that support email and messaging applications, web services, and customer relationship management.

In this example, system 102 includes a data center 104 and a data center 106. A network 108 connects data centers 104 and 106. Network 108 may include one or more networks such as the Internet, wide area networks, local area networks, wired networks and wireless networks. There may be any number of data centers.

Data centers 104 and 106 include hardware, such as multiple servers, that provide or support particular software applications. In this example, the distributed software application is an email and messaging application. Data center 104 includes a connector server 110, a store server 112, an Internet web server 114, and an active directory server 116. Connector server 110 connects the data center 104 to network 108 and users (offices). Store server 112 holds email mailboxes for one or more users, "User 1" 136 to "User N" 140. Internet web server 114 provides web-browser access to the mailboxes on store server 112. Active directory server 116 identifies all resources in data center 104 and makes the resources accessible to users. Resources may include email addresses in an email service (e.g., email aliases/addresses); websites in website service; and addresses of peripheral devices such as printers.

Likewise, data center 106 includes a connector server 122, a store server 124, an Internet web server 126, and an active directory server 128. Connector server 122 connects the data center 106 to network 108 and users (offices). Store server 124 holds email mailboxes for one or more users, "User 1" 150 to "User N" 156. Internet web server 126 provides web-browser access to the mailboxes on store 124. Active directory 128 identifies all resources in data center 106 and makes the resources accessible to users.

In this example, data center 104 supports one or more offices "office 1" 134 to "office N" 136. "Office 1" 134 includes multiple users shown as "user 1" 138 to "user N" 140, and "Office N" 136 includes multiple users shown as "user 1" 142 to "user N" 144. Data center 106 supports one or more offices "office 1" 146 to "office N" 148. "Office 1" 146 includes multiple users shown as "user 1" 150 to "user N" 152, and "Office N" 148 includes multiple users shown as "user 1" 154 to "user N" 156.

The number of data centers, offices and users may be changed based on an entity's projection or revised projection. As the number of offices and users changes, and so may the system 102, and specifically the number of servers in data centers 104 and 106. Further, as discussed below devices that the servers are composed of, may also change.

Figure 2:
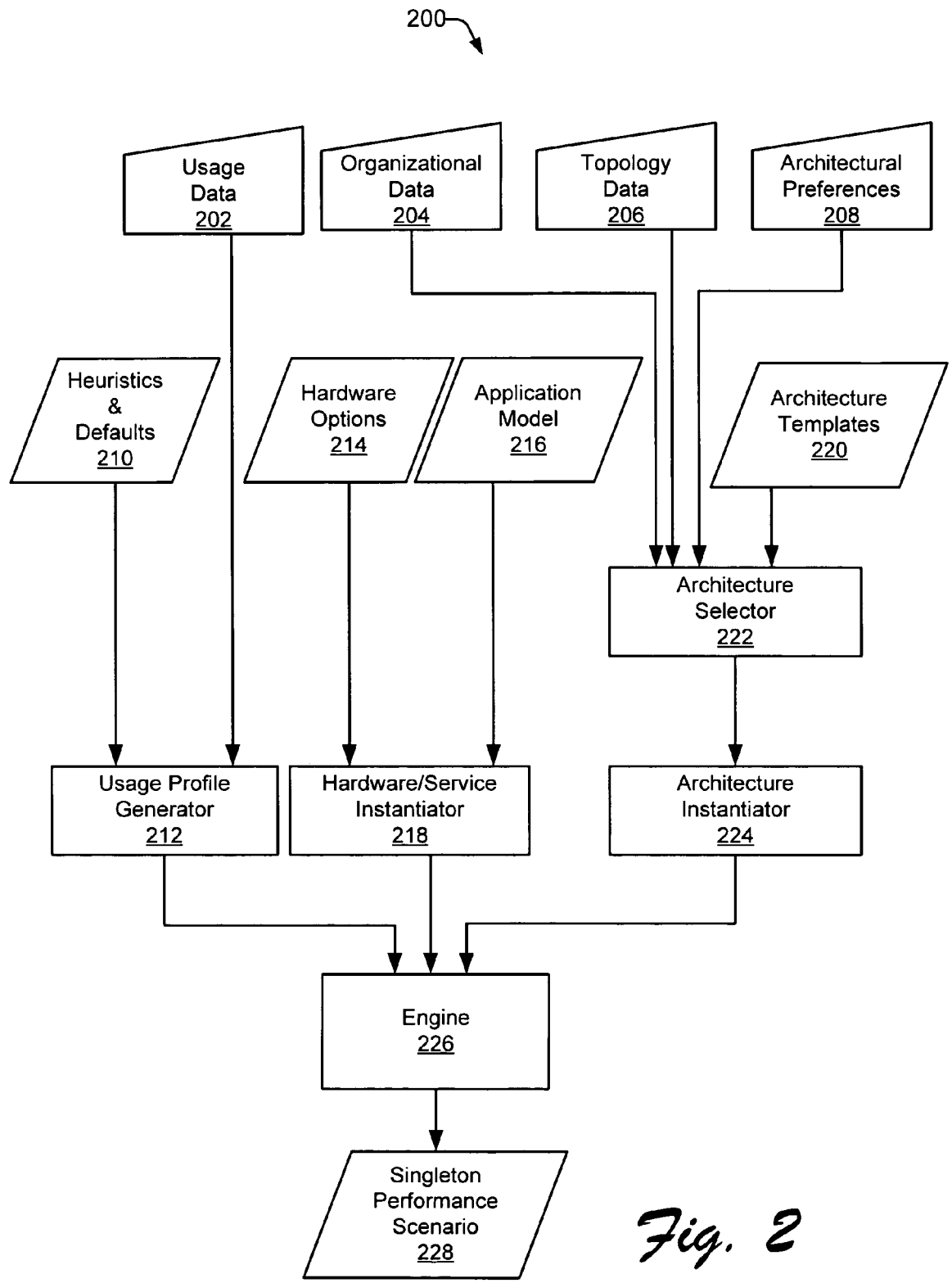
FIG. 2 is a block diagram implementation of a computer that includes an engine that provides a stage one prescriptive architecture recommendation.

FIG. 2 is an implementation at a computer that includes a singleton engine. Such a singleton engine and other components described in reference to FIG. 2 may be implemented as part of a computer such as computer 100, which is further described in FIG. 6 below. In this example, the singleton engine provides a stage one prescriptive architecture recommendation or singleton performance scenario.

An entity is asked to enter various manual inputs which may be entered by a user interface provided by a computer such as computer 100. In this example, the inputs include usage data 202, organizational data 204, topology data 206, and architectural preferences 208.

Usage data 202 includes information about how frequently a typical user uses each action of an application, with what parameters, and against what shared state. For example, how often a user reads email, how big that email is, and how many emails are in the user's mailbox when he does so. Since a typical distributed application supports many possible actions, which in turn may have many different parameters, and there are many individual users, a simplification may be made in order to provide usage data 202. For example, it may be assumed that users at a single location (i.e., office) have the same average behavior, and thus can be represented as multiple instances of a single "typical" individual.

Organizational data 204 includes information as to the number of users at a particular physical location or office (e.g., offices 132-134, 144-146). If particular applications can have more than one type of user, organizational data 204 can include the number of users of each type at each location or office. For example, an email application may be accessed by users via an 1) email client, 2) a web browser, or 3) a mobile phone. An individual user may be of a type that uses any subset of the three types in which email is accessed.

Topology data 206 includes the number of physical locations or offices that an entity desires to implement; the number of data centers that include servers; and network connections between offices and data centers. Consideration is also made as to network bandwidth and latency of transmission in and between offices and data centers.

Architectural preferences 208 describe an entity's choice for particular hardware options if such options are available. Examples of hardware options include choices between local disk storage (low-cost) versus redundant array of independent disks (RAID) arrays (relatively more expensive, but more reliable); standalone servers (low-cost) versus clustered serves (more expensive); and no firewalls (low-cost) versus firewalls (more expensive, but provides more protection).

Usage data 202 is combined with heuristics & defaults 210 at a user profile generator 212. Heuristics & defaults 210 includes data or profiles specific to particular industries or businesses, such as how a particular industry uses a particular service. For example, email usage (service) in the high tech industry may differ from that in the banking industry, which in turn may differ from that in the retail industry. An entity may therefore provide usage data based on a selection from a group of industries that best represents the entity's organization. Usage profile generator 212 combines assumptions provided in usage data 202 with heuristics & defaults input 210 to derive a set of usage data for users and offices. Continuing with the example of email services, if an entity selects "banking industry" the specific information from usage data 202 is mapped to how much email a typical banking industry employee (user) sends in a day, how large their inbox is, etc. A specific user and office profile is created by usage profile generator 212.

Hardware options 214 is chosen from a library or collection of hardware devices (e.g., CPUs, disks, network interconnects that make up a server) and servers implementing the hardware devices. The information in the library may include performance of particular hardware devices and/or servers. The library may be updated to include new hardware devices and/or servers or delete obsolete hardware devices and/or servers. Application model data 216 relates to services or applications supporting such services, and particularly hardware device constraints that apply to specific services or applications. For example, certain applications may only run on dual processor servers. Hardware/service instantiator 218 takes into consideration the hardware options 214 with the application model data 216 to arrive at specific hardware devices and servers that support the intended applications or services. A specific hardware profile based on the applications or services is created by hardware/service instantiator 218.

A set of architecture templates 220 is provided to an architecture selector 222. Architecture selector 222 receives topology data 206 to create an internal model of locations or offices. The internal model is matched against a number of architectural templates provided by architecture templates 220 to generate a "final" topology. For example, an email service may be deployed using one of three architectural templates: "hub and spoke" (one central data center connected to all other offices), "mesh connected" (every office contains its own data center, and has links to multiple other offices), or "multi-hub" (multiple data centers with links to each other, and multiple offices, each of which links to just one hub). If multiple architecture templates match a particular set of topology data (e.g., multiple data centers can be used to implement either hub-and-spoke or multi-hub), a fixed ranking may be used to determine which architectural template is preferred, based on best-practice recommendations applicable to particular applications.

Architectural preferences 208 is received by architecture selector 222 to further define the architecture, where architectural options are added as requested by the entity (e.g., the use of clustering servers; the use of a RAID array; etc.).

The organizational data 204 and topology data 206 are received by the architecture selector 222 to further determine applications and servers that are needed at particular data centers or offices. For example, a web access application (or server) may only be needed at a data center serving offices with web service users. Similarly, an office with few users and a low-latency link to a data center may not need its own active directory (or active directory server), since this office may be able to rely on an active directory server at the data center. However, if there are many users at this particular office, or a link to the data center has a high latency, authenticating to the data center directory would take an unacceptably high amount of time if the active directory is remote. Therefore, it would be preferable to have an active directory locally located at the office.

An architecture instantiator 224 creates an architecture based on the recommended architecture supplied by architecture selector 222. Specifically, the architecture instantiator 224 determines where servers (i.e., hardware) and applications should be placed.

An engine 226 receives the specific user profile created by usage profile generator 212, the specific hardware profile created by hardware/service instantiator 218, and the architecture created by architecture instantiator 224, and creates a singleton performance scenario 228 which describes a system such as system 102 of FIG. 1.

The singleton performance scenario 228 particularly describes architectural topology. Architectural topology may be chosen from one of the templates in architecture templates 220 and mapped to user topology as described in topology data 206. The singleton performance scenario 228 further describes applications in each data center; expected user load generated in each office; and particular types of server for each application in a data center. Each server may be described by specific types of devices (e.g., processors) included on the particular type of server.

Figure 3:
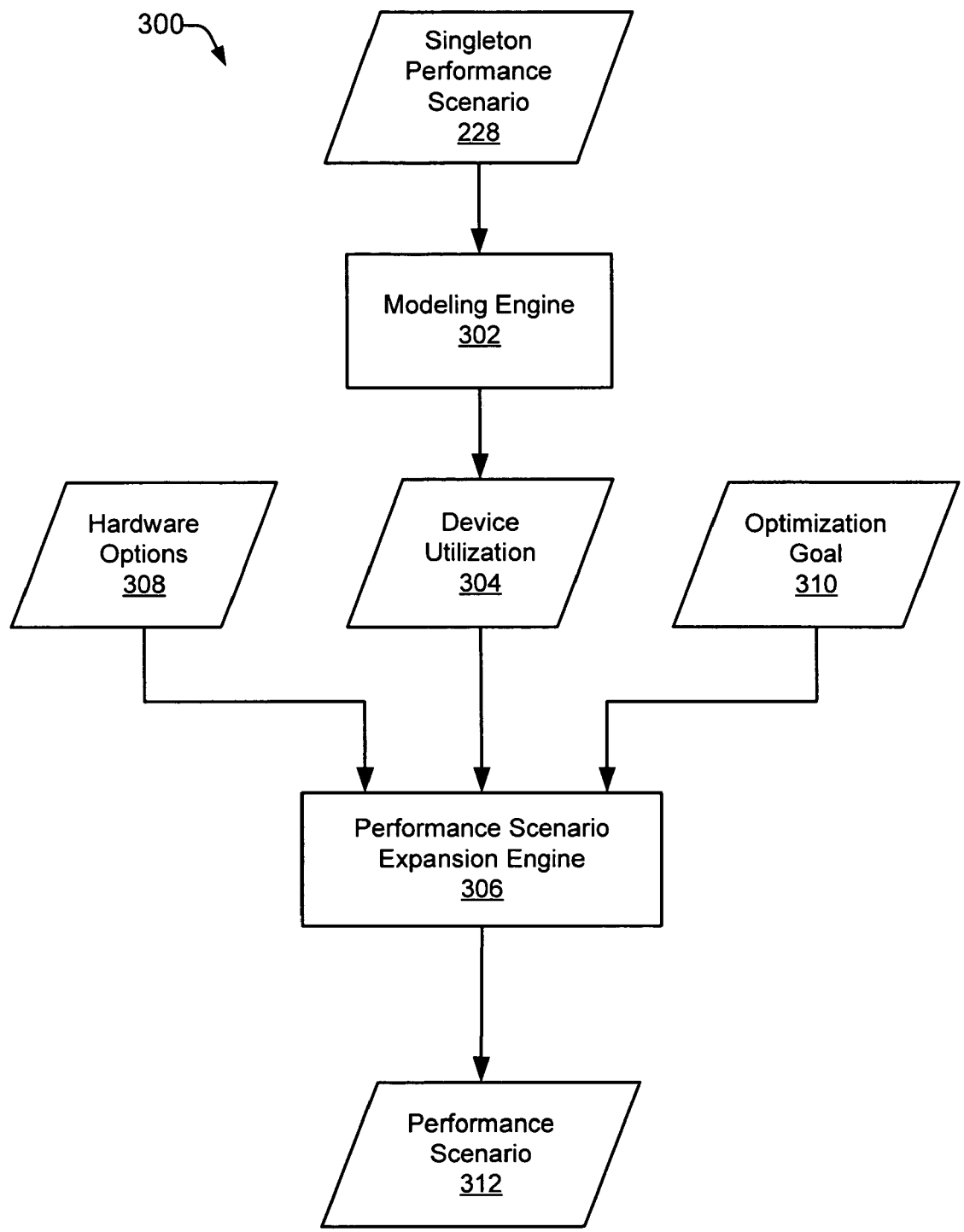
FIG. 3 is a block diagram implementation of a computer that includes a modeling engine and performance scenario engine that provide a stage two prescriptive architecture recommendation.

FIG. 3 is an implementation at a computer that includes a performance scenario expansion engine. Such a performance scenario expansion engine and other components described in reference to FIG. 3 may be implemented as part of computer such as computer 100, which is further described in FIG. 6 below. In this example, the performance scenario expansion provides a stage two prescriptive architecture recommendation or fully populated (optimized) performance scenario.

The singleton performance scenario 228 created by the engine 226, is received by a modeling engine 302. The modeling engine 302 performs a rapid evaluation of the single performance scenario 228. The modeling engine 302 computes an expected utilization based on user load from the dependent offices for each hardware device present in the single performance scenario 228, for example every hardware device in every server in every data center. A device utilization data 304 is created by the modeling engine 302 describing utilization of hardware devices.

At this point, a stage two prescriptive architecture recommendation may be performed by a performance scenario expansion engine 306. The performance scenario expansion engine 306 receives hardware options 308 that describe available devices, and particularly devices in servers, that may replace devices in the single performance scenario 228. Examples of devices that may be in a server include processors, disk storage, and network interface cards (NIC). Devices analyzed by the performance scenario expansion engine 306 are not necessarily limited to devices in a computer. More specifically, examples of other devices can also include network links and external storage systems. Each device is classified by type (i.e., processor type, disk storage type, NIC type). For each device type a specific utilization exists for specific applications.

The performance scenario expansion engine 306 also receives optimization goal 310 that describes device objectives. For example, if maximum allowable processor utilization is 80%, and expected processor utilization returned by the modeling engine 302 is 400%, then five processors are used for each server (400%/80%). Optimization goal 310 may also be adjusted to account for other objectives such as keeping latencies below specified levels.

Performance scenario expansion engine 306 performs a number of tasks. First, it scales the number of devices to handle the expected load. One approach is to add more devices of the same type to handle utilizations greater than 100% ("scale out"). "Scaling out" is performed using a specific maximum allowable utilization for each service (i.e., application) and device type. These maximum allowable utilizations are set to commonly-used levels, but may be adjusted. Another approach is to use fewer but more powerful devices of the same type ("scale up"). In this approach, the modeling engine recalculates a new device utilization 304 based on the new devices using the same inputs.

Second, the performance scenario expansion engine 306 maps to a particular number of servers the number of scaled devices that are determined for each application at each location (e.g., data center). Each server can have a maximum number of devices of a given type (CPU, disk, and network interface card). The device type with the highest ratio of (number of devices required)/(number of devices in a server) is used to calculate the number of servers.

Third, the performance scenario expansion engine 306 performs server consolidation if possible. For example, a particular data center may be lightly used, and uses two software applications. For a stage one prescriptive architecture recommendation, two separate servers may be provided at the data center. The modeling engine 302 may calculate that the maximum device utilization on each server will only be 20% (across all CPUs, disk, and network interface cards). Server consolidation can then take place, placing both applications onto a single server resulting in a maximum device utilization that is not expected to exceed 40%. Server consolidation may involve additional constraints from particular application(s). In certain cases, a constraint may be that only a certain combinations of applications may be allowed to be placed on a single server. In addition, the "maximum allowable" device utilizations from scaling the number of devices is not to be exceeded. For example, two software applications that each result in 45% processor utilization on individual servers should not be consolidated onto a single server if the maximum allowable CPU utilization is 80%.

A performance scenario output 312 is provided by the performance scenario expansion engine 306. The performance scenario output 312 particularly describes a fully populated performance scenario, based on best practice architectural templates, including details of the applications to be installed at each location (e.g., data center and offices), the number and type of servers required at each location, and devices that are included in the servers. The particular architecture described in performance scenario output 312 may modified as to particular hardware or hardware constraints of entity. A modified or unmodified performance scenario output 312 may then be run on modeling engine 302 to simulate expected device utilization and transaction latencies.

Figure 4:
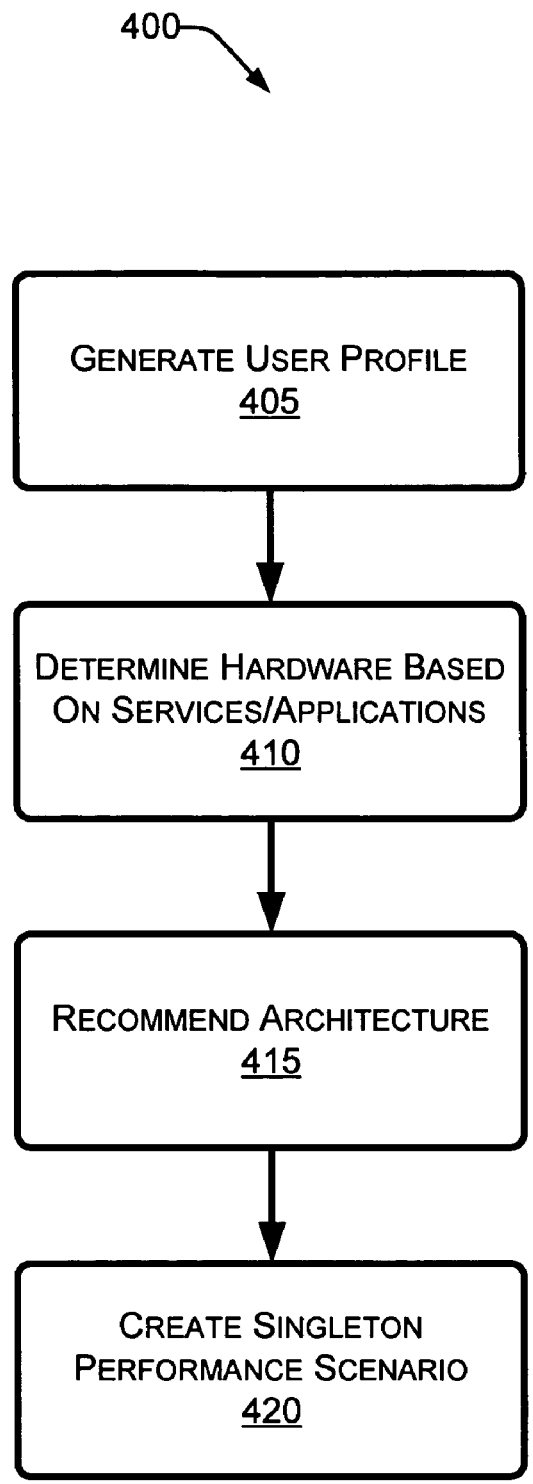
FIG. 4 is a flow diagram illustrating a process for providing a stage one prescriptive architecture recommendation.

FIG. 4 shows a process 400 to perform a stage one prescriptive architecture recommendation or singleton performance scenario. The process 400 is representative of the block diagram discussed in FIG. 2; however, process 400 is illustrated as a collection of blocks in a logical flow graph, which represent a sequence of operations that can be implemented in hardware, software, firmware, or a combination thereof, as an alternative to the block diagram discussed in FIG. 2. In the context of software, the blocks represent computer instructions that, when executed by one or more processors, perform the recited operations. Although described as a flowchart, it is contemplated that certain processes may take place concurrently or in a different order.

At block 405, a user profile is generated. The user profile may be generated based on particular usage data provided by an entity. Industry or business specific usage may also be applied in generating a user profile. The user profile is directed to anticipated system use of an entity.

At block 410, hardware that supports services, or applications supporting such services, is determined. The determined hardware may be based on particular hardware options that are available to the entity. Furthermore, limitations or needs of the applications are considered in determining the hardware.

At block 415, an architecture is recommended. The architecture is particularly directed to an architecture of servers that implement the hardware options. The recommended architecture may be based on particular usage data used in block 405. Organizational data may also be considered and includes specific information as to offices and users. Topology data may be considered and includes the number of physical locations or offices that an entity desires to implement, the number of data centers that include servers, and network connections between offices and data centers. Furthermore, architectural preferences of the entity may be considered. A particular template from a set of architecture templates may be chosen in recommended the architecture.

At block 420, a singleton performance scenario is created based on the generated user profile, the determined hardware, and recommended architecture. The singleton performance scenario describes architecture topology, application locations, expected user usage at locations, specific type of servers, and specific hardware implemented by the servers.

Figure 5:
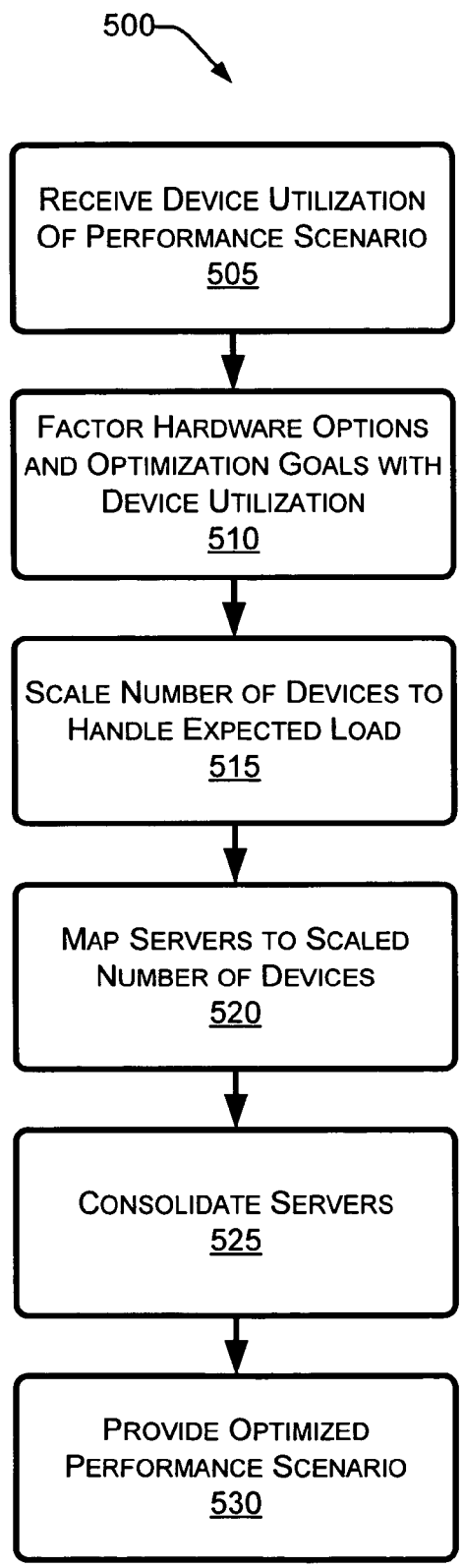
FIG. 5 is a flow diagram illustrating a process for providing a stage two prescriptive architecture recommendation.

FIG. 5 shows a process 500 to perform a stage two prescriptive architecture recommendation or optimized performance scenario. The process 500 is representative of the block diagram discussed in FIG. 3; however, process 500 is illustrated as a collection of blocks in a logical flow graph, which represent a sequence of operations that can be implemented in hardware, software, firmware, or a combination thereof, as an alternative to the block diagram discussed in FIG. 3. In the context of software, the blocks represent computer instructions that, when executed by one or more processors, perform the recited operations. Although described as a flowchart, it is contemplated that certain processes may take place concurrently or in a different order.

At block 505, a scenario is received that describes device utilization. The scenario may be a singleton performance scenario that has been processed to determine device utilization. In particular, device utilization is based on devices in particular servers supporting a particular user load.

At block 510, hardware options and optimization goals are factored with device utilization. Hardware options describe available devices that may be replaced in servers. Optimization goals describe device objectives as to utilization.

At block 515, the number of devices is scaled, where the scaled number is specific to an expected user load. Scaling may include specifying a maximum utilization for each device or scaling out. Alternatively scaling may be using more powerful devices of the same type or scaling up. Regardless of the method of scaling, scaling is directed to a particular user expected load.

At block 520, servers are mapped to the scaled number of devices. It is determined (a ratio taken) how many devices of a device type are required for application(s) over the number of devices in a server. The device type with the highest ratio determines the number of servers that are used.

At block 525, servers are consolidated if possible. Consolidation takes into account device utilization on each server and the applications that running on the devices and servers. For example, applications may not be consolidated on a server if the device utilization for the application exceeds the maximum allowable utilization for a particular device on the server.

At block 530, an optimized performance scenario is provided. The scenario describes a fully populated performance scenario, based on best practice architectural templates, including details of applications installed at each location (e.g., data center and offices), the number and type of servers required at each location, and devices that are included in the servers.

Exemplary Computer

Figure 6:
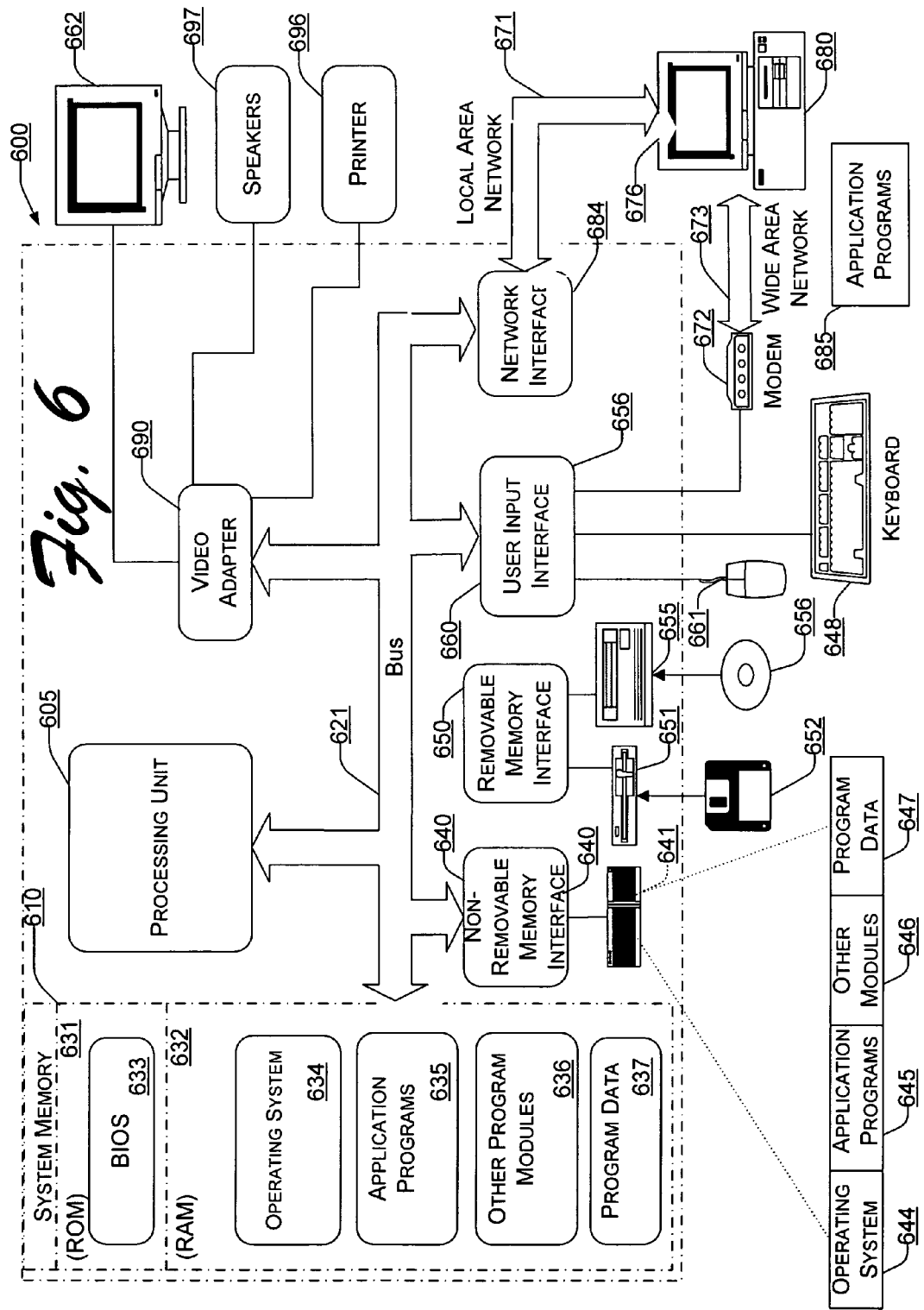
FIG. 6 is a block diagram of a detailed implementation of a computer that implements prescriptive architecture recommendation.

FIG. 6 shows an exemplary computing device or computer 600 suitable as an environment for practicing aspects of the subject matter. In particular computer 600 describes in greater detail computer 100. In specific, computer 600 may be provide an exemplary implementation of the components (e.g., engines) described in FIGS. 2 and 3. Computer 600 is suitable as an environment for practicing aspects of the subject matter. The components of computer 600 may include, but are not limited to processing unit 605, system memory 610, and a system bus 621 that couples various system components including the system memory 610 to the processing unit 605. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Exemplary computer 600 typically includes a variety of computer-readable media. Computer-readable media can be any available media that can be accessed by computer 600 and includes both volatile and nonvolatile media, removable and non-removable media. By way of example, and not limitation, computing device-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by management server 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 610 includes computing device storage media in the form of volatile and/or nonvolatile memory such as read only memory (ROM) 631 and random access memory (RAM) 632. A basic input/output system 633 (BIOS), containing the basic routines that help to transfer information between elements within computer 600, such as during start-up, is typically stored in ROM 631. RAM 632 typically contains data and/or program modules that are immediately accessible to and/or presently being operated on by processing unit 605. By way of example, and not limitation, FIG. 6 illustrates operating system 634, application programs 635, other program modules 636, and program data 637. Other program modules 636 may include components such as user profile generator 212, hardware/service instantiator 218, architecture selector 222, architecture instantiator 222, singleton engine 226, modeling engine 302, and performance scenario expansion engine 306, The computer 600 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/ nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface such as interface 650.

The drives and their associated computing device storage media discussed above and illustrated in FIG. 6 provide storage of computer-readable instructions, data structures, program modules, and other data for computer 600. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the exemplary computer 600 through input devices such as a keyboard 648 and pointing device 661, commonly referred to as a mouse, trackball, or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port, or in particular a USB port. Examples of user input data includes usage data 202, organizational data 204, topology data 206, and architectural preferences 208 described above.

A monitor 662 or other type of display device is also connected to the system bus 621 via an interface, such as a video interface 690. In addition to the monitor 662, computing devices may also include other peripheral output devices such as speakers 697 and printer 696, which may be connected through an output peripheral interface 695.

The exemplary management server 600 may operate in a networked environment using logical connections to one or more remote computing devices, such as a remote computing device 680. The remote computing device 680 may be a personal computing device, a server, a router, a network PC, a peer device or other common network node, and typically includes many or all of the elements described above relative to management server 600. The logical connections depicted in FIG. 6 include a local area network (LAN) 671 and a wide area network (WAN) 673, but may also include other networks such as network 106 described above. Such networking environments are commonplace in offices, enterprise-wide computing device networks, intranets, and the Internet.

When used in a LAN networking environment, the exemplary management server 600 is connected to the LAN 671 through a network interface or adapter 670. When used in a WAN networking environment, the exemplary computer 600 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the exemplary computer 600, or portions thereof, may be stored in a remote memory storage device. By way of example, and not limitation, FIG. 6 illustrates remote application programs 685. It will be appreciated that the network connections shown are exemplary and other means of establishing a communications link between the computing devices may be used.

CONCLUSION

The above-described methods and computer describe prescribing architectures to support distributed software applications. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a computing device by a processor configured to execute instructions comprising:
    generating a user profile directed to anticipated system use exclusive to an entity of a distributed application system of applications that are supported on various hardware, wherein the entity further provides at least one of usage data, organizational data, topology data, and architectural preferences;
    determining hardware from the various hardware, that supports the generated user profile in the distributed application system, wherein the hardware includes servers and networked devices that are available only to the entity;
    recommending a network architecture that implements the hardware options, wherein the network architecture is based at least on one of the usage data provided by the entity and specific to a particular industry, the organizational data describing specific information of offices and users associated with the offices, the topology data describing physical locations of offices that the entity desires to implement, and the architectural preferences of the entity, wherein the network architecture is available exclusively to the entity;

creating a performance scenario describing architectural topology of the distributed application system as a topology of a plurality of networked devices of the determined hardware, based on the user profile, the hardware, and the architecture; and optimizing the performance scenario by:
- factoring device options that are used in servers employed in the distributed application system;
- scaling devices used in the servers based on a load applicable to the devices; and
- consolidating the applications on the determined hardware.

2. The method of claim 1, wherein the generating the user profile includes industry or business specific usage data.

3. The method of claim 1, wherein the determining hardware includes hardware options that are selected from a library or collection of the servers and hardware devices implementing the hardware devices.

4. The method of claim 3, wherein the hardware options selected are based on specific services or applications.

5. The method of claim 1, wherein the recommending includes applications and servers that are needed at a particular data center.

6. The method of claim 1, wherein the recommending considers the topological data, wherein the topological data creates an internal model of locations or the offices, that are matched against a number of architectural templates to generate a final topology.

7. The method of claim 1, wherein the creating the performance scenario includes computing an expected utilization based on user load from dependent offices for each of the hardware devices in every server in every data center.

8. One or more computer-readable storage medium comprising computer-executable instructions that, when executed perform the method as recited in claim 1.

9. A computing device comprising:
- a processing unit;
- a usage profile generator component generating a user profile, wherein the user profile is directed to system use exclusive to an entity of a distributed application system that includes applications supported by hardware of the system, wherein the system use includes data or profiles specific to particular industries or businesses;
- a hardware instantiator component generating a hardware profile, wherein the hardware profile identifies the hardware of the system that includes servers and networked devices that support the generated user profile;
- an architecture instantiator component recommending a network architecture, wherein the network architecture implements the hardware of the system, and the architecture is based at least on one of usage data, organizational data, topology data, and architectural preferences of the entity, wherein the network architecture is exclusive to the entity; and
- an engine component creating a performance scenario, wherein the performance scenario describes architectural topology of the distributed application system as a topology of a plurality of networked devices of the determined hardware, based on the user profile, the hardware, and the architecture; and optimizing the performance scenario by consolidating the applications on particular hardware of the system by factoring device options that are used in servers employed in the distributed application system and scaling devices used in the servers based on a load applicable to the devices.

10. The computing device of claim 9, wherein the usage profile generator component combines assumptions provided in the usage data with the data or the profiles specific to the particular industries or businesses.

11. The computing device of claim 9, wherein the hardware instantiator component includes hardware options that are selected from a library or collection of servers and networked devices implementing the hardware devices.

12. The computing device of claim 11, wherein the hardware options selected are based on specific services or applications.

13. The computing device of claim 9, wherein the architecture instantiator component further determines a particular data center where servers and applications are placed.

14. The computing device of claim 9, wherein the architecture instantiator component further determines which architectural template is preferred based on best-practice recommendations applicable to particular applications.

15. The computing device of claim 9, wherein the engine component creates the performance scenario describing applications in one or more data centers, expected load in one or more offices, and types of servers for each application in the data centers.

16. A distributed application system comprising:
- two or more data centers that provide particular software applications to support one or more offices; and
- a network that connects the data centers to one another, wherein each data center performs the following:
- generates a user profile directed to anticipated system use exclusive to an entity of the distributed application system, wherein the entity further provides at least one of usage data, organizational data, topology data, and architectural preferences;
- determines a hardware profile, wherein the hardware profile includes a hardware that supports the generated user profile;
- recommends an architecture that implements the hardware that supports the user profile, wherein the architecture is based at least on one of the usage data provided by the entity and specific to a particular industry, the organizational data describing specific information of offices and users associated with the offices, the topology data describing physical locations of offices that the entity desires to implement, and the architectural preferences of the entity, wherein the architecture is exclusively available to the entity;
- creates a performance scenario describing architectural topology of the distributed application system as a topology of a plurality of hardware devices of the determined hardware, based on the user profile, the hardware, and the architecture; and
- optimizes the performance scenario by consolidating the particular software applications on hardware provided by the hardware profile by factoring device options that are used in servers employed in the distributed application system and scaling devices used in the servers based on a load applicable to the devices.

17. The distributed application system of claim 16, wherein each data center determines the hardware profile that includes hardware options available to the entity.

18. The distributed application system of claim 16, wherein each data center recommends the architecture that includes applications and servers that are needed at a particular data center.

19. The distributed application system of claim 16, wherein each data center creates the performance scenario that is a singleton performance scenario describing applications in the data center, expected load in one or more offices, and types of servers for each application in the data center.

20. The distributed application system of claim 16, wherein each data center comprises an active directory component, wherein the active directory component identifies resources in each data center, and makes the resources accessible to one or more users.

* * * * *